(12) United States Patent
Hoshino et al.

(10) Patent No.: US 10,669,918 B2
(45) Date of Patent: Jun. 2, 2020

(54) HEAT INSULATING STRUCTURE FOR INTERNAL COMBUSTION ENGINE

(71) Applicant: MAZDA MOTOR CORPORATION, Hiroshima (JP)

(72) Inventors: Tsukasa Hoshino, Hiroshima (JP); Kenji Sugasaki, Hiroshima (JP); Kazumi Okamura, Hatsukaichi (JP); Makoto Shinhama, Hiroshima (JP); Masanobu Koutoku, Higashihiroshima (JP); Ryo Yamamoto, Hiroshima (JP); Yukiya Tanaka, Higashihiroshima (JP); Toshimichi Nishikawa, Nisshin (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 165 days.

(21) Appl. No.: 15/759,079

(22) PCT Filed: Mar. 6, 2017

(86) PCT No.: PCT/JP2017/008688
§ 371 (c)(1),
(2) Date: Mar. 9, 2018

(87) PCT Pub. No.: WO2017/169529
PCT Pub. Date: Oct. 5, 2017

(65) Prior Publication Data
US 2019/0048779 A1  Feb. 14, 2019

(30) Foreign Application Priority Data

Mar. 29, 2016  (JP) .................................. 2016-066423

(51) Int. Cl.
*F02F 7/00* (2006.01)
*F01N 13/10* (2010.01)
(Continued)

(52) U.S. Cl.
CPC .............. *F01N 13/102* (2013.01); *B60K 5/00* (2013.01); *B60K 11/085* (2013.01); *F01N 3/24* (2013.01);
(Continued)

(58) Field of Classification Search
CPC ....... B60K 11/085; B60K 5/00; F01N 11/005; F01N 13/102; F01N 13/14; F01N 13/141;
(Continued)

(56) References Cited

U.S. PATENT DOCUMENTS 3,882,951 A * 5/1975 Conley ..................... B60K 5/10
                                              180/294
4,203,407 A * 5/1980 Fachbach .................. F01N 3/05
                                              123/198 E
(Continued)

FOREIGN PATENT DOCUMENTS

JP  H05-014535 U   2/1993
JP  H10-274055 A  10/1998
(Continued)

OTHER PUBLICATIONS

International Search Report issued in PCT/JP2017/008688; dated May 16, 2017.

*Primary Examiner* — Matthew T Largi
(74) *Attorney, Agent, or Firm* — Studebaker & Brackett PC

(57) ABSTRACT

A heat insulating structure of an internal combustion engine (engine 1) includes a cylinder-head-side heat insulating cover (30) and a cylinder-block-side heat insulating cover (40). Each of the first side walls (32) of the cylinder-head-side heat insulating cover (30) is disposed outwardly of, and is spaced apart from, a corresponding one of the second side walls (43) of the cylinder-block-side heat insulating cover (40) in the width direction of the vehicle. The lower edge of
(Continued)

each of the first side walls (32) is positioned below the upper edge of the corresponding one of the second side walls (43) to overlap with the corresponding one of the second side walls (43) when viewed from the side of the vehicle.

11 Claims, 8 Drawing Sheets

(51) Int. Cl.
*F01N 3/24* (2006.01)
*F01P 11/10* (2006.01)
*F02B 77/11* (2006.01)
*F01N 11/00* (2006.01)
*B60K 5/00* (2006.01)
*F01N 13/14* (2010.01)
*B60K 11/08* (2006.01)
*F01P 7/10* (2006.01)
*F01P 1/00* (2006.01)

(52) U.S. Cl.
CPC ............ *F01N 11/005* (2013.01); *F01N 13/14* (2013.01); *F01N 13/141* (2013.01); *F01P 7/10* (2013.01); *F01P 11/10* (2013.01); *F02B 77/11* (2013.01); *F02F 7/00* (2013.01); *F02F 7/0095* (2013.01); *B60Y 2410/114* (2013.01); *F01N 2900/1404* (2013.01); *F01N 2900/1602* (2013.01); *F01P 2001/005* (2013.01); *F02F 2007/0075* (2013.01); *Y02T 10/47* (2013.01)

(58) Field of Classification Search
CPC ............ F01N 3/24; F01N 2900/1404; F01N 2900/1602; F01P 11/10; F01P 7/10; F01P 2001/005; F02B 77/11; F02F 7/00; F02F 7/0095; F02F 2007/0075; B60Y 2410/114
See application file for complete search history.

(56) References Cited

U.S. PATENT DOCUMENTS

| | | | |
|---|---|---|---|
| 4,338,889 A * | 7/1982 | Kirchweger | .......... F01N 13/102 123/195 C |
| 4,459,944 A * | 7/1984 | Kirchweger | ........ B60R 13/0838 123/195 C |
| 4,610,326 A * | 9/1986 | Kirchweger | .......... B60K 11/08 123/41.62 |
| 4,854,278 A * | 8/1989 | Honecker | .............. B60K 11/02 123/198 E |
| 4,995,356 A | 2/1991 | Kronich | |
| 10,422,270 B2 * | 9/2019 | Tanno | .................. B62D 25/082 |
| 2004/0020448 A1 | 2/2004 | Sato | |
| 2013/0133963 A1* | 5/2013 | Ajisaka | .................. B60K 11/04 180/68.1 |
| 2013/0146376 A1* | 6/2013 | Nam | ...................... B60K 11/06 180/68.1 |
| 2013/0240284 A1* | 9/2013 | Ajisaka | ................. F01N 3/2006 180/309 |
| 2015/0252716 A1* | 9/2015 | Tanno | .................... B60K 13/04 123/41.58 |
| 2018/0291804 A1* | 10/2018 | Nola | ................... B60R 13/0838 |
| 2019/0275962 A1* | 9/2019 | Yamashita | ............. B60R 13/07 |

FOREIGN PATENT DOCUMENTS

| | | |
|---|---|---|
| JP | 2000-502157 A | 2/2000 |
| JP | 2002-195048 A | 7/2002 |
| JP | 2007-170241 A | 7/2007 |
| JP | 2010-149670 A | 7/2010 |
| JP | 2013-119384 A | 6/2013 |
| JP | 2015-083788 A | 4/2015 |
| KR | 10-2009-0120787 A | 11/2009 |

* cited by examiner

VEHICLE WIDTH DIRECTION

HEAT INSULATING STRUCTURE FOR INTERNAL COMBUSTION ENGINE

TECHNICAL FIELD

The present disclosure relates to a heat insulating structure of an internal combustion engine, in particular, a heat insulating structure of an internal combustion engine which is housed in an engine compartment provided in the front of a vehicle, and closed/opened by a bonnet, and which includes a cylinder block and a cylinder head coupled to the top of the cylinder block.

BACKGROUND ART

Conventionally, heat insulating structures for heat insulating an internal combustion engine including a cylinder block and a cylinder head coupled to the top of the cylinder block are known in the art. Patent Document 1 discloses a heat insulating structure of an internal combustion engine configured as an engine encapsulation structure including an engine compartment encapsulation member surrounding the upper portion of a power train configured as an assembly of an engine (internal combustion engine) and a transmission in an engine compartment, and an underbody encapsulation member surrounding the lower portion of the power train. The engine compartment encapsulation member and the underbody encapsulation member are provided such that the engine compartment encapsulation member and the underbody encapsulation member are vertically assembled together in a space between the power train and a vehicle body to surround the power train, and that air, for cooling the power train, flowing from an inlet of a front surface in the state where the engine compartment encapsulation member and the underbody encapsulation member are vertically assembled together is discharged from an outlet of a rear surface where the underbody encapsulation member is opened.

CITATION LIST

Patent Document

PATENT DOCUMENT 1: Japanese Unexamined Patent Publication No. 2013-119384

SUMMARY OF THE INVENTION

Technical Problem

In the heat insulating structure of the internal combustion engine as disclosed in Patent Document 1, the engine compartment encapsulation member and the underbody encapsulation member can heat insulate the internal combustion engine and the transmission. On top of that, allowing headwind from the front inlet to be introduced in each encapsulation member can substantially prevent an excessive increase in the temperature of the entire internal combustion engine.

However, respective components constituting the internal combustion engine have different types of demands for heat insulation. For example, a cylinder head including low-heat-resistant components such as a fuel injection system is required to have high cooling performance in addition to heat insulating performance. In contrast, a cylinder block having cylinders is required to keep the temperature of the cylinders, and thus, the heat insulating performance has priority over the cooling performance.

That is to say, although the heat insulating structure of the internal combustion engine disclosed in Patent Document 1 can heat-insulate the internal combustion engine and the transmission and also can cool the internal combustion engine, it is difficult, for example, to cool the cylinder head while heat-insulating the cylinder block.

The present disclosure is conceived in view of the above problems, and intends to provide a technique capable of cooling a portion of an internal combustion engine while heat-insulating the entire internal combustion engine.

Solution to the Problem

The present disclosure is directed to a heat insulating structure of an internal combustion engine which is housed in an engine compartment provided in a front of a vehicle, and closed/opened by a bonnet, and which includes a cylinder block and a cylinder head coupled to the top of the cylinder block. The heat insulating structure includes: a cylinder-head-side heat insulating cover having a top wall facing, and spaced apart from, a head top surface of the cylinder head, and covering a whole of the head top surface, first side walls extending in a longitudinal direction of the vehicle, each facing, and spaced apart from, a corresponding one of both side surfaces of the cylinder head in a width direction of the vehicle and a corresponding one of upper portions of both side surfaces of the cylinder block in the width direction of the vehicle, and each covering the corresponding one of the both side surfaces of the cylinder head in the width direction of the vehicle and the corresponding one of the upper portions of the both side surfaces of the cylinder block in the width direction of the vehicle, and releasing portions formed at respective both edges of the cylinder-head-side heat insulating cover in a longitudinal direction of the vehicle; and a cylinder-block-side heat insulating cover having a front wall covering a front surface of the cylinder block closer to a front of the vehicle, a rear wall covering a rear surface of the cylinder block closer to a rear of the vehicle, and second side walls each covering a corresponding one of the both side surfaces of the cylinder block in the width direction of the vehicle. Each of the first side walls is disposed outwardly of, and is spaced apart from, a corresponding one of the second side walls in the width direction of the vehicle, and a lower edge of each of the first side walls is positioned below an upper edge of the corresponding one of the second side walls to overlap with the corresponding one of the second side walls when viewed from a side of the vehicle.

According to this configuration, the cylinder-head-side and cylinder-block-side heat insulating covers are provided. The cylinder-head-side heat insulating cover covers the whole of the head top surface of the cylinder head, both side surfaces of the cylinder head in the width direction of the vehicle, and upper portions of both side surfaces of the cylinder block in the width direction of the vehicle. The cylinder-block-side heat insulating cover covers the front and rear surfaces of the cylinder block closer to the front and rear of the vehicle, and both side surfaces of the cylinder block in the width direction of the vehicle. Furthermore, the lower portion of the first side wall of the cylinder-head-side heat insulating cover overlaps with the upper portion of the corresponding second side wall of the cylinder-block-side heat insulating cover when viewed from the side of the vehicle. Therefore, the interior of the cylinder-head-side and cylinder-block-side heat insulating covers can be sufficiently heat-insulated. This allows for heat-insulating the entire internal combustion engine, compared with a case where there is no cylinder-head-side and cylinder-block-side heat insulating covers.

Heat of the cylinder head 2 and the cylinder block 3 dissipates due to heat transmission and radiation to air after the internal combustion engine is stopped. The air, around the cylinder head and the cylinder block, that has been heated because of heat transmission from the cylinder head and the cylinder block moves upward and stays in the cylinder-head-side heat insulating cover. Allowing the lower edge of the first side wall of the cylinder-head-side heat insulating cover to be positioned below the upper edge of the second side wall can increase the volume of the air housed inside the cylinder-head-side heat insulating cover. Therefore, the cylinder head can be covered with a large amount of air that has been heated, thereby making it possible to efficiently heat-insulate the cylinder head. Furthermore, the lower portion of the first side wall and the upper portion of the second side wall overlap with each other when viewed from the side of the vehicle. The coinciding portion can double shield radiation from the cylinder block, and thus, the cylinder block can also be efficiently heat-insulated.

The cylinder-head-side heat insulating cover is provided with the releasing portions at both edges of the cylinder-head-side heat insulating cover in the longitudinal direction of the vehicle. Thus, the headwind during running of the vehicle can flow from the front releasing portion of the cylinder-head-side closer to the front of the vehicle into the cylinder-head-side heat insulating cover, and passes along the rear releasing portion of the cylinder-head-side heat insulating cover closer to the rear of the vehicle to be able to pass through the cylinder-head-side heat insulating cover. When the headwind during running of the vehicle passes through the cylinder-head-side heat insulating cover, the headwind passes through the space between the top wall and the top surface of the cylinder head, the space between each of the first side walls and the corresponding one of the side surfaces of the cylinder head in the width direction of the vehicle, and the space between each of the first side walls and the corresponding one of the side surfaces of the cylinder block in the width direction of the vehicle. The front surface of the cylinder block closer to the front of the vehicle is covered with the front wall of the cylinder-block-side heat insulating cover. Thus, no headwind blows against the front surface of the cylinder block closer to the front of the vehicle. Also, each of the first side walls is disposed outwardly of, and spaced apart from, the corresponding one of the second side walls in the width direction of the vehicle. Thus, the space between the second side wall and the corresponding side surface of the cylinder block in the width direction of the vehicle is narrower than the space between the first side wall and the corresponding side surface of the cylinder block in the width direction of the vehicle. Therefore, the headwind hardly enters the space between the second side wall and the corresponding side surface of the cylinder block in the width direction of the vehicle. Thus, the cylinder block is less likely to be cooled by the headwind than the cylinder head. As a result, the cylinder block can be kept warm while the cylinder head can be actively cooled.

Accordingly, it becomes possible to cool a portion of the internal combustion engine while heat-insulating the entire internal combustion engine.

In one embodiment of the heat insulating structure of the internal combustion engine, in the cylinder-block-side heat insulating cover, the front wall is in contact with the front surface of the cylinder block closer to the front of the vehicle, the rear wall is in contact with the rear surface of the cylinder block closer to the rear of the vehicle, and each of the second walls is in contact with the corresponding one of the both side surfaces of the cylinder block in the width direction of the vehicle.

That is to say, with the front wall in contact with the front surface of the cylinder block closer to the front of the vehicle, the rear wall in contact with the rear surface of the cylinder block closer to the rear of the vehicle, and each of the second walls in contact with the corresponding one of the both side surfaces of the cylinder block in the width direction of the vehicle, no headwind during running of the vehicle blows against the portions of the cylinder block in contact with the top wall, the rear wall, and the second side walls. Thus, the portions of the cylinder block in contact with the top wall, the rear wall, and the second side walls are not cooled by the headwind. As a result, the cylinder-block-side heat insulating cover can more effectively heat-insulate the cylinder block.

In the heat insulating structure of the internal combustion engine, it is preferable that an exhaust emission control device be disposed behind the internal combustion engine in the longitudinal direction of the vehicle, and below an edge of the top wall closer to the rear of the vehicle, a space between the cylinder-head-side heat insulating cover and the internal combustion engine form a flow channel in which headwind during running of the vehicle flows from the releasing portion closer to the front of the vehicle, and is discharged from the releasing portion closer to the rear of the vehicle, and a portion of the top wall closer to the rear of the vehicle be curved obliquely downward such that the headwind that has flowed in the flow passage flows toward the exhaust emission control device.

For example, under high speed driving conditions, since high temperature exhaust gas is likely to flow in the exhaust emission control device, the temperature of the exhaust emission control device is likely to rise. Under such conditions, if the temperature of the exhaust emission control device exceeds the upper limit of the activation temperature of the catalyst in the exhaust emission control device, the exhaust gas purification performance of the catalyst is deteriorated.

In order to prevent deterioration of the exhaust gas purification performance of the exhaust emission control device due to such high temperature exhaust gas, a method of cooling the exhaust emission control device may be applicable, the method including mixing unburned fuel into exhaust gas, vaporizing the unburned fuel with heat of the exhaust emission control device, and cooling the direct catalyst using the heat of vaporization. However, according to this method, fuel consumption increases by such the amount of such unburned fuel to be mixed into the exhaust gas.

A portion of the top wall closer to the rear of the vehicle is obliquely curved downwardly such that the headwind that has flowed in the flow passage formed in the space between the cylinder-head-side heat insulating cover and the internal combustion engine flows toward the exhaust emission control device. This configuration allows the headwind that has flowed in the flow passage to blow against the exhaust emission control device. As a result, the headwind can cool the exhaust emission control device. Thus, cooling the unburned fuel as described above is not needed or, even if such cooling of the unburned fuel is performed, the amount of the unburned fuel to be mixed can be reduced. As a result, deterioration of the exhaust purification performance of the exhaust emission control device can be prevented. On top of that, an increase in the fuel consumption due to cooling of the exhaust emission control device can be prevented, too.

In the heat insulating structure of the internal combustion engine in which the flow passage is formed in the space between the cylinder-head-side heat insulating cover and the internal combustion engine, it is preferable that a grille shutter be disposed in a front part of the vehicle at a position closer to the front of the vehicle than an edge of the cylinder-head-side heat insulating cover closer to the front of the vehicle, and control a flow rate of the headwind to be introduced into the flow passage in the space between the cylinder-head-side heat insulating cover and the internal combustion engine.

That is to say, if the temperature of the cylinder head has to be raised, it is not preferable to allow the headwind during running of the vehicle to flow into the flow passage. After the rise of the temperature of the cylinder head, it is preferable to actively introduce the headwind in the flow passage such that the temperature of the cylinder head rises excessively. Providing the grille shutter at the position closer to the front of the vehicle than the edge of the cylinder-head-side heat insulating cover closer to the front of the vehicle allows for adjusting the introducing amount of the headwind into the flow passage according to the requirement for cooling the cylinder head. As a result, the appropriate temperature of the cylinder head can be kept.

In the heat insulating structure of the internal combustion engine, it is preferable that the cylinder-head-side heat insulating cover be vertically divided into an upper cylinder-head-side heat insulating cover and a lower cylinder-head-side heat insulating cover, the upper cylinder-head-side heat insulating cover being detachable from the lower cylinder-head-side heat insulating cover, the upper cylinder-head-side heat insulating cover include the top wall and upper portions of the first side walls, the lower cylinder-head-side heat insulating cover include lower portions of the first side walls, and the lower cylinder-head-side heat insulating cover of the upper and lower cylinder-head-side heat insulating covers overlap with an upper portion of the cylinder-block-side heat insulating cover when viewed from the side of the vehicle.

According to this configuration, the cylinder-head-side heat insulating cover is vertically divided into the upper cylinder-head-side heat insulating cover and the lower cylinder-head-side heat insulating cover, the upper cylinder-head-side heat insulating cover being detachable from the lower cylinder-head-side heat insulating cover. Thus, when the upper cylinder-head-side heat insulating cover is detached, the internal combustion engine becomes visible from above. If the upper and lower cylinder-head-side heat insulating covers are integrally formed together, it is necessary to detach the entire cylinder-head-side heat insulating cover from the vehicle body. On the other hand, if the upper cylinder-head-side heat insulating cover is configured to be detachable from the lower cylinder-head-side heat insulating cover, the upper cylinder-head-side heat insulating cover may be detached from the lower cylinder-head-side heat insulating cover. As a result, the cover can be easily detached during the maintenance of the internal combustion engine.

In the heat insulating structure of the internal combustion engine, it is preferable that a coinciding portion of the first side wall of the cylinder-head-side heat insulating cover and the second side wall of the cylinder-block-side heat insulating cover have a vertical length set to 40 mm or more.

That is to say, if the vertical length of the coinciding portion of the first side wall of the cylinder-head-side heat insulating cover and the second side wall of the cylinder-block-side heat insulating cover is too short, the cylinder-head-side heat insulating cover might not sufficiently heat-insulate the cylinder head. Setting the vertical length of the coinciding portion to 40 mm or more allows the cylinder-head-side heat insulating cover to sufficiently heat-insulate the cylinder head.

Advantages of the Invention

In view of the foregoing description, according to the heat insulating structure of the internal combustion engine in the present disclosure, each of the first side walls is disposed outwardly of, and spaced apart from, the corresponding one of the second side walls in the width direction of the vehicle, and the lower edge of each of the first side walls is positioned below the upper edge of the corresponding one of the second side walls to overlap with the corresponding one of the second side walls when viewed from the side of the vehicle. Thus, the cylinder head can be kept warm and cooled appropriately, whereas the cylinder block has improved heat insulating performance. As a result, it becomes possible to cool a portion of an internal combustion engine while heat-insulating the entire internal combustion engine.

DESCRIPTION OF EMBODIMENTS

An embodiment of the present disclosure will now be described in detail with reference to the drawings.

Figure 1:
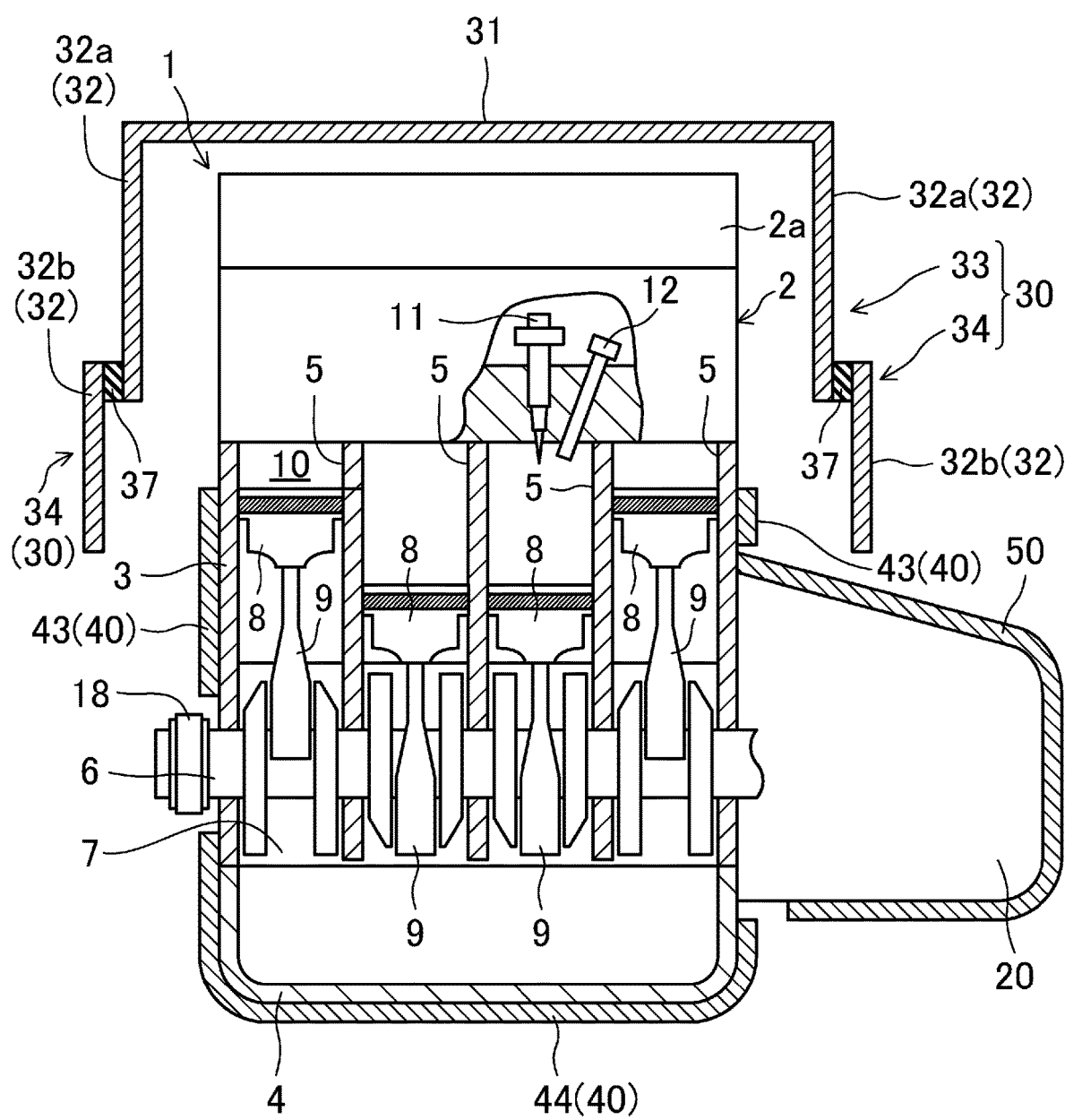
FIG. 1 is a schematic diagram of an engine that is an internal combustion engine having a heat insulating structure according to an embodiment of the present disclosure.

FIG. 1 is a cross-sectional view of a multi-cylinder engine (hereinafter referred to as "engine 1") that is an internal combustion engine having a heat insulating structure according to the embodiment. This engine 1 is horizontally disposed in an engine compartment in the front of the vehicle such that the cylinder bank direction coincides with the vehicle width direction (the lateral direction in FIG. 1). That is to say, the engine 1 is a transverse engine. The engine 1 is arranged such that its upper portion is slanted toward the rear of the vehicle.

The engine 1 is comprised of a cylinder head 2, a cylinder block 3, and an oil pan 4 which are arranged vertically in this order and coupled together. In the following description, a side adjacent to the cylinder head 2 will be referred to as an "upper side," and a side adjacent to the oil pan 4 will be referred to as a "lower side."

In the upper portion of the cylinder block 3, four cylinders 5 are arranged in a single row to form a cylinder bank. In the lower portion of the cylinder block 3, a crankcase 7 in which a crankshaft 6 is disposed is provided.

A piston 8 is inserted into each of the cylinders 5 to be slidable in the inner periphery of the respective cylinder 5. The piston 8 is coupled to the crankshaft 6 through a connecting rod 9. A combustion chamber 10 is provided in each cylinder 5 (only one is illustrated in FIG. 1), i.e., is defined by a top surface of the piston 8, the inner wall surface of the cylinder 5, and the bottom surface of the cylinder head 2.

The cylinder head 2 is provided with, for each cylinder 5, an intake port (not illustrated) for introducing fresh air into the combustion chamber 10, and an exhaust port (not illustrated) for discharging exhaust gas from the combustion chamber 10. The cylinder head 2 is also provided with an inlet (not illustrated) and an outlet (not illustrated) for allowing the intake and exhaust ports to communicate with the combustion chamber 10. The cylinder head 2 is further provided with an intake valve (not illustrated) and an exhaust valve (not illustrated) which are configured to open/close the inlet and the outlet, and is further provided with a valve opening/closing mechanism (not illustrated) for opening/closing the intake and exhaust valves.

The cylinder head 2 is further provided with a fuel injection valve 11 and an ignition plug 12 for each cylinder 5 (only one valve and one plug are illustrated in FIG. 1). The fuel injection valve 11 injects fuel into the combustion chamber 10, and the ignition plug 12 ignites the fuel injected into the combustion chamber 10 by the fuel injection valve 11.

A head cover 2a is attached to the top of the cylinder head 2.

The oil pan 4 stores oil which is supplied to, e.g., a bearing metal (not illustrated) of the crankshaft 6 and a valve opening/closing mechanism, particularly a hydraulic valve opening/closing mechanism. Although not illustrated, an oil pump is disposed in the lower portion of the cylinder block 3 to supply oil to each component of the engine 1.

A transmission 20 is coupled to one side of the engine 1 in the cylinder bank direction (on the left of the vehicle (on the right of FIG. 1) in this embodiment). The engine 1 and the transmission 20 constitute a power plant. The transmission 20 is an automatic transmission, and has a transmission mechanism such as a torque converter (not illustrated) in a transmission case. The transmission 20 is horizontally disposed in which input and output shafts, which are not illustrated, extend in the vehicle width direction. The input shaft is coupled to the crankshaft 6 of the engine 1, and the output shaft is coupled to a differential gear 23 (see FIG. 2) disposed in a portion of the transmission 20 closer to the rear of the vehicle. Although not illustrated, right and left front-wheel-drive shafts respectively coupled to right and left front wheels extend from the differential gear 23 toward both sides in the vehicle width direction.

Figure 2:
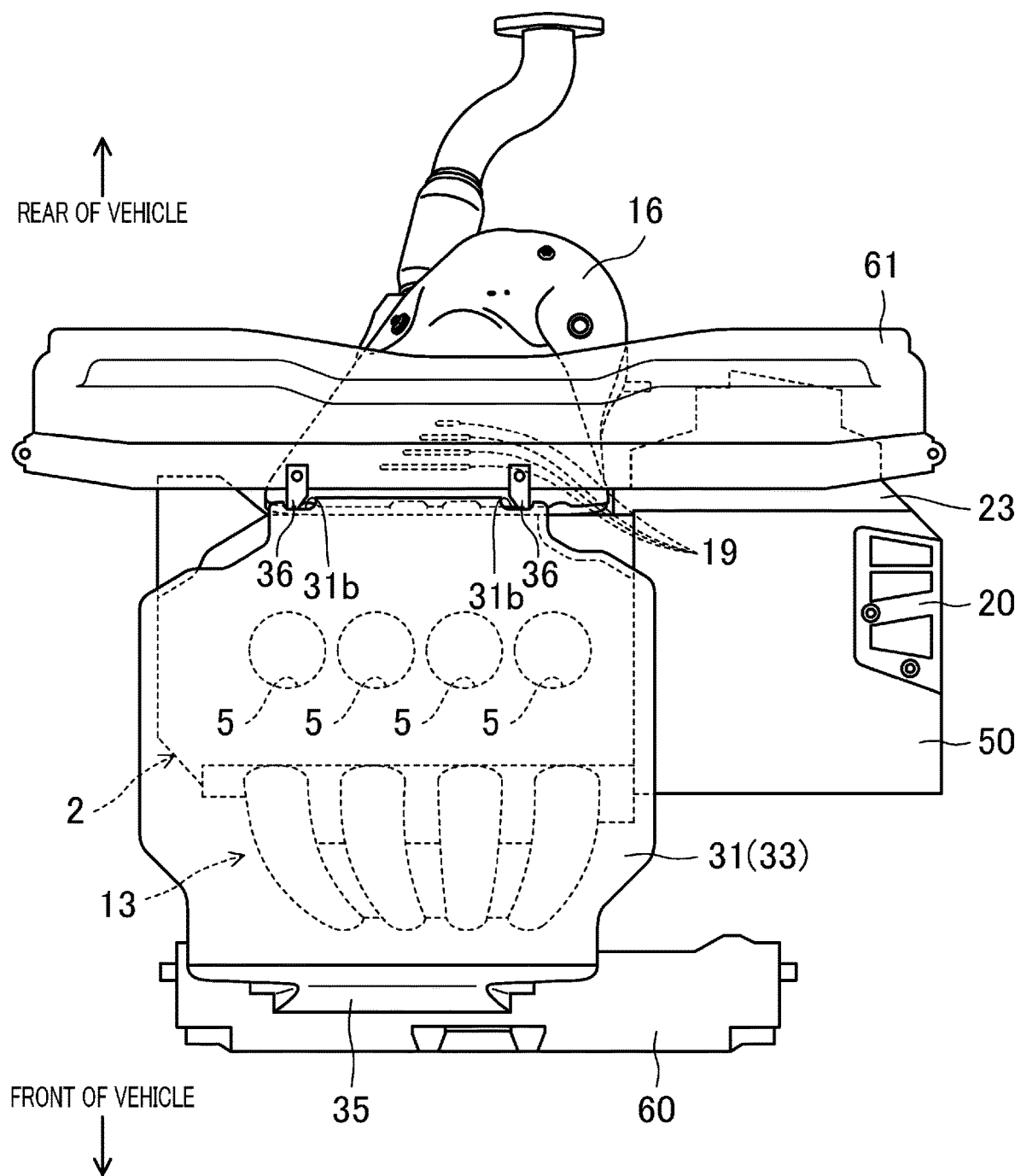
FIG. 2 illustrates a state where a cover covers the engine and a transmission when viewed from above.

As illustrated in FIG. 2, an intake manifold 13 is provided to a portion of the engine 1 closer to the front of the vehicle to introduce intake air into each cylinder 5 of the engine 1. This intake manifold 13 has four intake air branch pipes associated with respective four cylinders 5 of the engine 1. The intake air branch pipes are curved from a surge tank extending in the cylinder bank direction (the vehicle width direction) toward an end of the intake port away from the combustion chamber 10. The intake air branch pipes associated with the respective cylinders 5 are connected to openings of the intake ports of the cylinders 5 open to side surfaces of the engine 1 closer to the front of the vehicle to communicate with the respective cylinders 5.

As illustrated in FIG. 2, an exhaust manifold is provided, covered with a heat insulator 16, to a portion of the engine 1 closer to the rear of the vehicle to exhaust gas from each cylinder 5 of the engine 1. The exhaust manifold has four exhaust gas branch pipes associated with the four cylinders 5 of the engine 1, though the four exhaust gas branch pipes cannot be viewed in FIG. 2 since they are covered with the heat insulator 16. The four exhaust gas branch pipes converge into one concentrate pipe in a downstream side of a flow of exhaust air. The concentrate pipe is connected to a direct catalyst 17 functioning as an exhaust emission control device for purifying exhaust gas (see FIG. 7). The exhaust air branch pipes associated with the respective cylinders 5 are connected to openings of the exhaust ports of the cylinders 5 away from the combustion chamber 10, the openings being open to side surfaces of the engine 1 closer to the rear of the vehicle, to communicate with the respective cylinders 5. An upper portion of the heat insulator 16 is provided with a plurality of openings 19 for introducing headwind during running of the vehicle into the heat insulator 16.

The engine 1 is covered with a heat insulating cover 30 adjacent to the cylinder head (hereinafter referred to as a "cylinder-head-side heat insulating cover"), and a heat insulating cover 40 adjacent to the cylinder block (hereinafter referred to as a "cylinder-block-side heat insulating cover"). Here, with reference to FIGS. 1-5, the configurations of the respective heat insulating covers 30 and 40 will be described.

The cylinder-head-side heat insulating cover 30 is a heat insulating cover covering an entire top surface the cylinder head 2, the whole of both side surfaces of the cylinder head 2 in the vehicle width direction, and the upper portions of both side surfaces of the cylinder block 3 in the vehicle width direction. The cylinder-block-side heat insulating cover 40 is a heat insulating cover covering the entire cylinder block 3. Each of the cylinder-head-side heat insulating cover 30 and cylinder-block-side heat insulating cover 40 is comprised of a fiber material, such as glass wool, having heat insulating and sound absorbing properties. This allows the cylinder-head-side heat insulating cover 30 and the cylinder-block-side heat insulating cover 40 not only to heat-insulate the engine 1, but also to substantially prevent engine sound leakage to the outside of the vehicle.

The cylinder-head-side heat insulating cover 30 includes a top wall 31 and first side walls 32, as illustrated in FIG. 1. The top wall 31 covers the entire top surface of the cylinder head 2. The first side walls 32 cover side surfaces of the cylinder head 2 in the vehicle width direction, and upper portions of both side surfaces of the cylinder block 3 in the vehicle width direction.

The top wall 31 faces, and is spaced apart from, the top surface of the cylinder head 2 (i.e., the head top surface of the head cover 2a). Each of the first side walls 32 faces, and is spaced apart from, a corresponding one of the side surfaces of the cylinder head 2 in the vehicle width direction, and faces, and is spaced apart from, a corresponding one of the side surfaces of the cylinder block 3 in the vehicle width direction.

Each of the first side walls 32 is vertically divided into an upper side wall 32a and a lower side wall 32b. The upper side wall 32a covers an upper portion of the corresponding side surface of the cylinder head 2 in the vehicle width direction. The lower side wall 32b covers the lower portion of the corresponding side surface of the cylinder head 2 in the vehicle width direction, and the upper portion of the corresponding side surface of the cylinder block 3 in the vehicle width direction.

In other words, each of the first side walls 32 is vertically divided into the upper and lower portions. Thus, the cylinder-head-side heat insulating cover 30 is vertically divided into an upper cylinder-head-side heat insulating cover 33 and a lower cylinder-head-side heat insulating cover 34. The upper cylinder-head-side heat insulating cover 33 includes the top wall 31 and the upper side wall 32a which is the upper portion of the first side wall 32, and which is integrally formed with the top wall 31. The lower cylinder-head-side heat insulating cover 34 includes the lower side wall 32b that is the lower portion of the first side wall 32.

Both edges of the cylinder-head-side heat insulating cover 30 in the longitudinal direction of the vehicle are provided with a releasing portion 39 (see FIGS. 5 and 7) where no wall is formed.

The top wall 31 of the upper cylinder-head-side heat insulating cover 33, as illustrated in FIG. 2, covers the entire top surfaces of the cylinder head 2 and the intake manifold 13. The length of the top wall 31 in the vehicle width direction is extended or reduced in conformity with the shape of the components connected to the cylinder head 2.

Specifically, the portion of the top wall 31 closer to the front of the vehicle is provided with a radiator shroud 60 fixed to a front side frame (not illustrated). The top wall 31 extends from the position of the radiator shroud 60 toward the rear of the vehicle with a predetermined length in the vehicle width direction, and extends toward the outside in the vehicle width direction so as to avoid the right side surface of the cylinder head 2 (in the vehicle width direction) and the surge tank. The top wall 31 further extends to the end of the cylinder head 2 closer to the rear of the vehicle with the extended length in the vehicle width direction, and both sides of the top wall 31 in the vehicle width direction is reduced inwardly in the vehicle width direction to reach a position near a dash panel 61 located in a portion of the upper cylinder-head-side heat insulating cover 33 closer to the rear of the vehicle. Also, as illustrated in FIG. 2, cutouts 31b are formed at positions close to both ends, in the vehicle width direction, of the top wall 31 on the edge closer to the rear of the vehicle. The cutouts 31b are cut upward to allow a hinge mechanism 36, which will be described later, to open/close the upper cylinder-head-side heat insulating cover 33.

Figure 3:
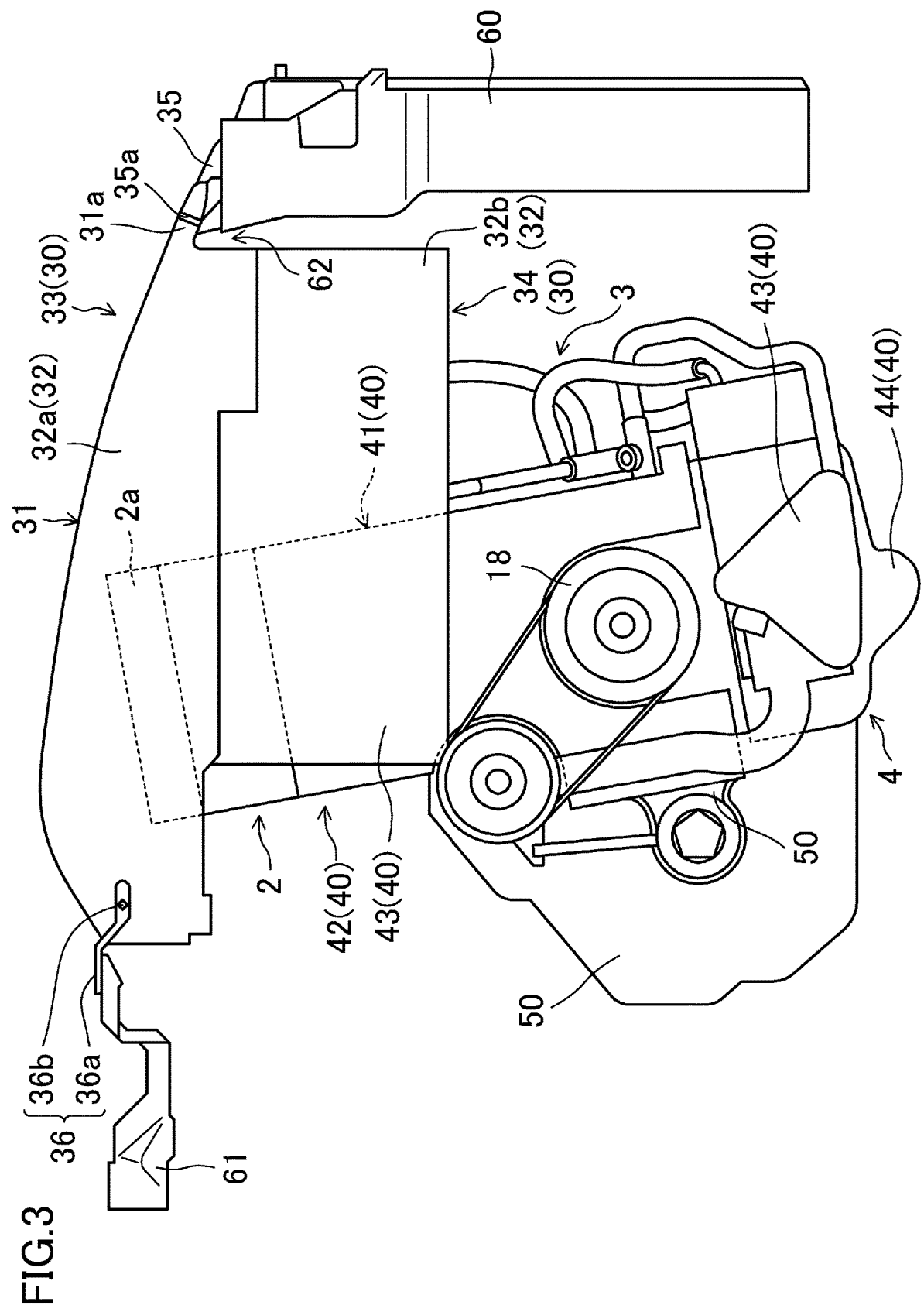
FIG. 3 illustrates the state where the cover covers the engine and the transmission when viewed from a side away from the transmission.
Figure 4:
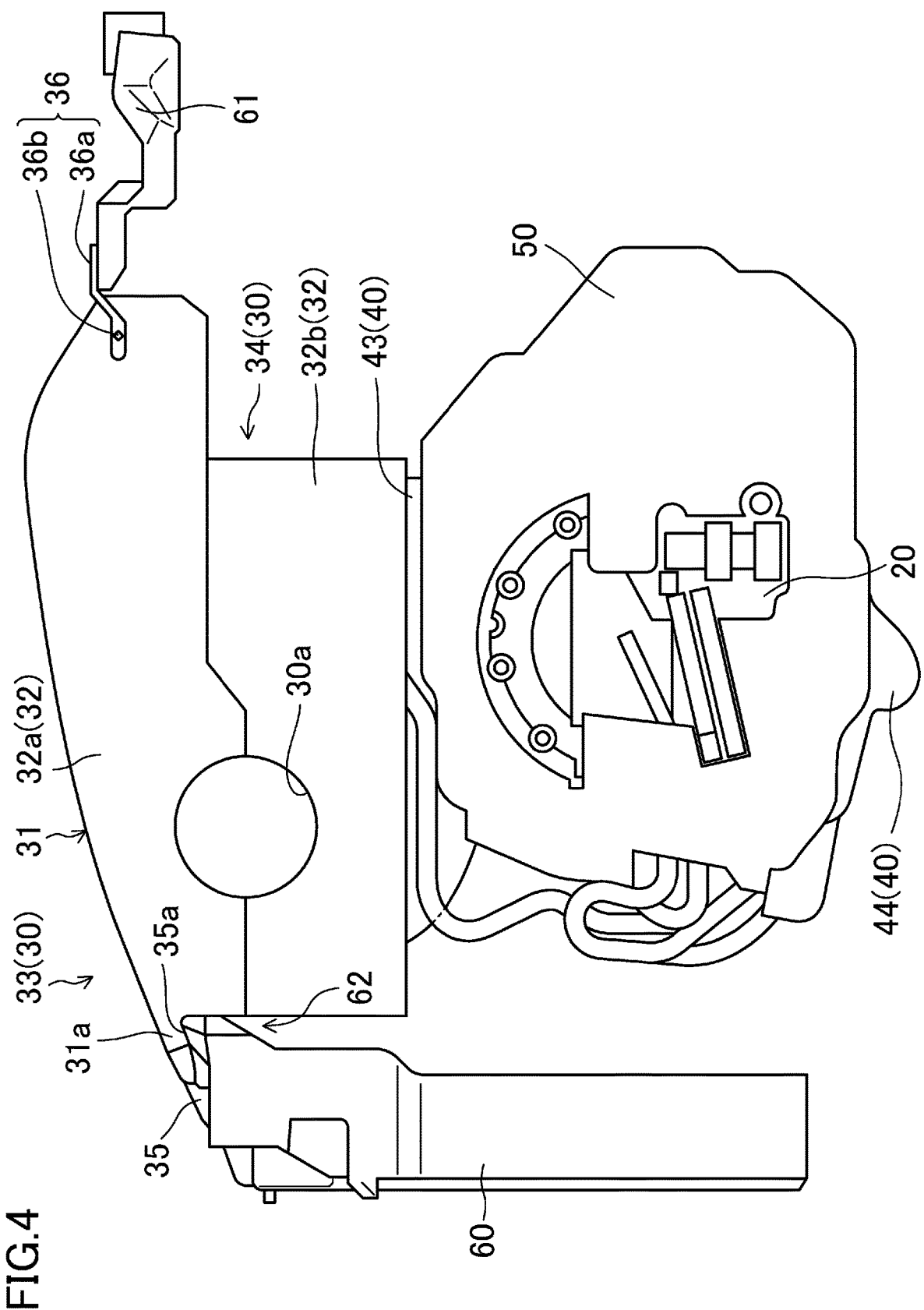
FIG. 4 illustrates the state where the cover covers the engine and the transmission when viewed from a side adjacent to the transmission.

The top wall 31, as illustrated in FIGS. 3 and 4, extends obliquely upwardly from the location of the radiator shroud 60 toward the rear of the vehicle when viewed from the side of the vehicle. The top wall 31 is then curved obliquely downward from a position corresponding to an end of the exhaust manifold on the upstream side of the flow of exhaust air (a connection portion between the exhaust manifold and the exhaust port) in the longitudinal direction of the vehicle, and reaches a position near the dash panel 61. The curved shape of the top wall 31 closer to the rear of the vehicle is appropriately adjusted such that headwind, during running of the vehicle, introduced from the opening 39a (see FIG. 5) in the front of the vehicle into the cylinder-head-side heat insulating cover 30 flows toward the direct catalyst 17 (see FIG. 7) connected to an end of the exhaust manifold on the downstream side of the flow of exhaust air.

Further, as illustrated in FIGS. 3 and 4, the edge of the top wall 31 closer to the front of the vehicle protrudes toward the front of the vehicle beyond the edge of the upper side wall 32a closer to the front of the vehicle. This protrusion (hereinafter referred to as "protrusion 31a") is mounted on the front support 35.

As illustrated in FIG. 1, the upper side wall 32a of the upper cylinder-head-side heat insulating cover 33 has the upper edge integrally formed with both edges of the top wall 31 in the vehicle width direction. The upper side wall 32a is therefore integrally formed with the top wall 31, and extends substantially perpendicularly downwardly from the portion integrally formed with the top wall 31.

Also, as illustrated in FIG. 4, the upper side wall 32a on the left in the vehicle width direction has a downwardly open cutout at a portion corresponding to the surge tank. This cutout and a cutout formed in the lower side wall 32b form a through-hole 30a. This through-hole 30a is provided to allow, e.g., an intake pipe to extend to the outside of the cylinder-head-side heat insulating cover 30. Although not illustrated, the through-hole 30a is sealed after the extension of, e.g., the intake pipe by a cushioning material, such as urethane, having a heat insulating property.

The upper cylinder-head-side heat insulating cover 33 is supported by vehicle body members near the front and rear of the vehicle, as illustrated in FIGS. 2-4. How the vehicle body members support the upper cylinder-head-side heat insulating cover 33 will specifically be described.

As illustrated in FIG. 2, the top surface of the radiator shroud 60 is provided with the front support 35 supporting the portion of the upper cylinder-head-side heat insulating cover 33 closer to the front of the vehicle. The front support 35 is fixed to the radiator shroud 60. As described above, the radiator shroud 60 is fixed to the front side frames constituting the vehicle body members. Thus, the front support 35 is supported by the vehicle body members through the radiator shroud 60. As illustrated in FIGS. 3 and 4, a step 35a is formed in a portion of the front support 35 closer to the rear of the vehicle. The above-described protrusion 31a of the top wall 31 is mounted on the step 35a. This allows the front support 35 to support the portion of the upper cylinder-head-side heat insulating cover 33 closer to the front of the vehicle. The top surface of the front support 35 is tilted upward toward the rear side of the vehicle so as to be continuous with the shape of the top surface of the top wall 31 with the protrusion 31a mounted on the step 35a.

As illustrated in FIGS. 3 and 4, a space 62 is formed between the radiator shroud 60 and the edge of the upper side wall 32a, closer to the front of the vehicle, of the upper cylinder-head-side heat insulating cover 33 with the protrusion 31a mounted on the step 35a of the front support 35. This space 62 is a space for avoiding contact between the edge of the upper side wall 32a closer to the front of the vehicle (in particular, the lower edge of the upper side wall 32a closer to the front of the vehicle) and the radiator shroud 60 when the upper cylinder-head-side heat insulating cover 33 is rotated upward by a hinge mechanism 36, which will be described later.

The portion of the upper cylinder-head-side heat insulating cover 33 closer to the rear of the vehicle is provided with hinge mechanisms 36 functioning as a rear support supporting the portion of the upper cylinder-head-side heat insulating cover 33 closer to the rear of the vehicle. As illustrated in FIG. 2, the hinge mechanisms 36 are provided at both sides of the portion of the upper cylinder-head-side heat insulating cover 33 closer to the rear of the vehicle in the vehicle width direction. Each of the hinge mechanisms 36, as illustrated in FIGS. 3 and 4, is comprised of a bracket 36a and a pin 36b. The bracket 36a is fixed to the dash panel 61 that is one vehicle body member. The pin 36*b* is attached to the bracket 36*a*. Specifically, a portion of each bracket 36*a* closer to the rear of the vehicle is fixed to the dash panel 61 with, e.g., a bolt, and extends toward the front of the vehicle from the fixed portion in the longitudinal direction of the vehicle. The pin 36*b* is attached to a portion of the bracket 36*a* closer to the front of the vehicle so as to protrude outwardly of the bracket 36*a* in the vehicle width direction. The portion of the pin 36*b* protruding outwardly in the vehicle width direction is inserted through the edge of the upper side wall 32*a*, closer to the rear of the vehicle, of the upper cylinder-head-side heat insulating cover 33. This allows the upper cylinder-head-side heat insulating cover 33 to be rotated vertically with the pin 36*b* as a fulcrum. With the pin 36*b* inserted through the edge of the upper side wall 32*a* closer to the rear of the vehicle, the portion of the upper cylinder-head-side heat insulating cover 33 closer to the rear of the vehicle is supported on the dash panel 61, that is the vehicle body member, by the hinge mechanism 36. That is to say, the hinge mechanism 36 rotatably supports the cylinder-head-side heat insulating cover 30, specifically, the upper cylinder-head-side heat insulating cover 33.

The cylinder-head-side heat insulating cover 30 is vertically divided into the upper cylinder-head-side heat insulating cover 33 and the lower cylinder-head-side heat insulating cover 34, and the upper cylinder-head-side heat insulating cover 33 is vertically rotatably supported by the hinge mechanisms 36. This allows the upper cylinder-head-side heat insulating cover 33 to rotate, with the pin 36*a* of the hinge mechanism 36 as a fulcrum, between a close position of the cylinder-head-side heat insulating cover 30 where the engine 1 is covered, and shielded, from above, and an open position where the engine 1 is visible from above.

Figure 5:
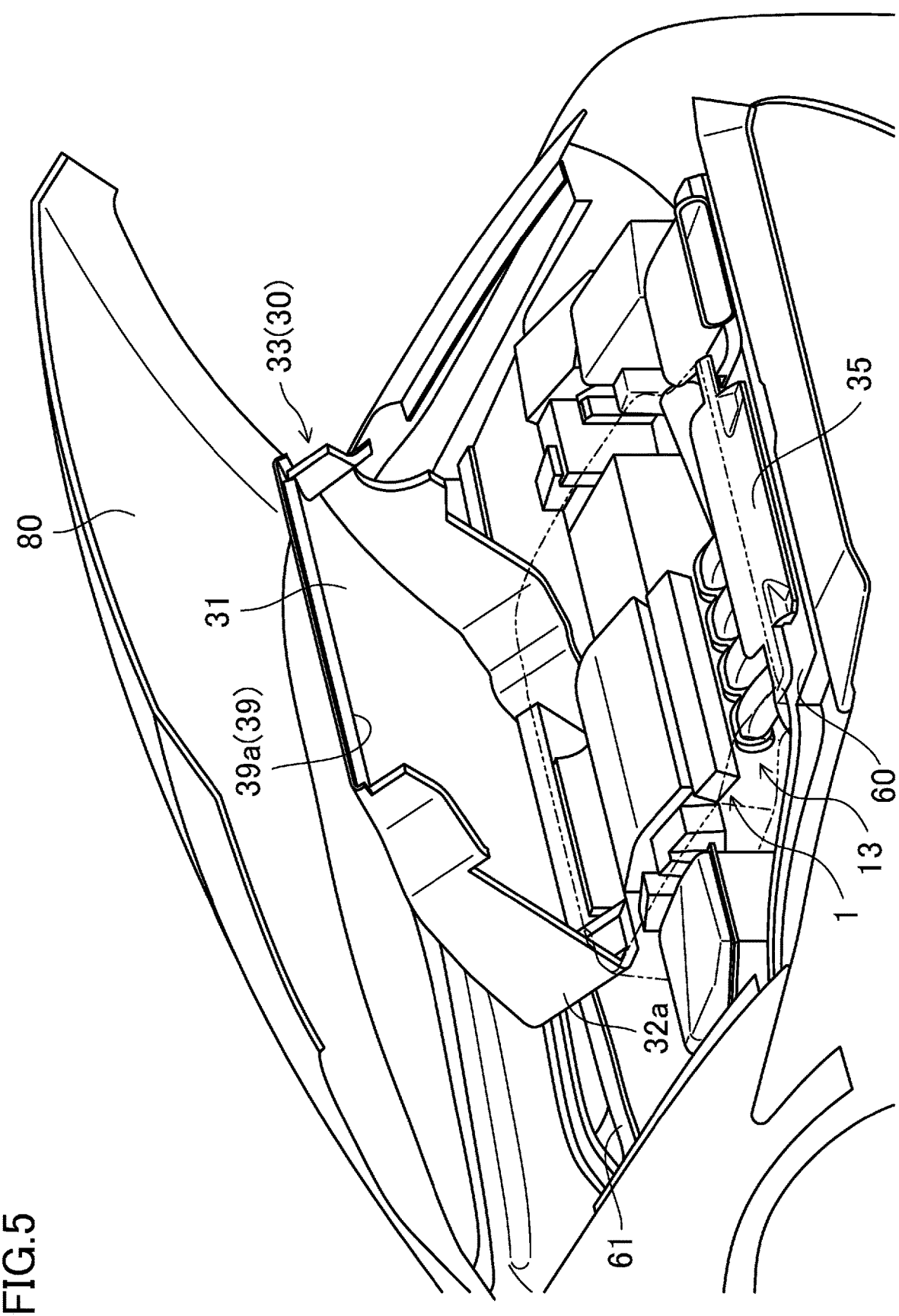
FIG. 5 is a view illustrating a state where an upper cylinder-head-side heat insulating cover is opened with the engine and the transmission mounted in a vehicle.

As illustrated in FIG. 5, when the upper cylinder-head-side heat insulating cover 33 is rotated upward with the pin 36*a* as a fulcrum, the upper cylinder-head-side heat insulating cover 33 is positioned at the open position where the engine 1 is visible from above. In contrast, when the upper cylinder-head-side heat insulating cover 33 is rotated downward from the open position, the upper cylinder-head-side heat insulating cover 33 is positioned at the close position where the engine 1 is covered, and shielded, from above, as indicated by the imaginary line in FIG. 5.

As illustrated in FIG. 1, each lower cylinder-head-side heat insulating cover 34 is disposed outwardly of the upper cylinder-head-side heat insulating cover 33 in the vehicle width direction. The upper edge of the lower cylinder-head-side heat insulating cover 34, i.e., the upper edge of the lower side wall 32*b* is provided with a rubber member 37 extending across the entire upper edge in the longitudinal direction of the vehicle. The upper cylinder-head-side heat insulating cover 33 (strictly speaking, the upper side wall 32*a* of the upper cylinder-head-side heat insulating cover 33) is configured, when being at the close position, to abut on the rubber member 37 in the lower cylinder-head-side heat insulating cover 34 (i.e., the lower side wall 32*b*) from the side of the vehicle. As a result, no gap is formed between the lower edge of the upper cylinder-head-side heat insulating cover 33 and the upper edge of the lower cylinder-head-side heat insulating cover 34, more specifically, between the upper side wall 32*a* and the lower side wall 32*b* across the longitudinal direction of the vehicle. This prevents deterioration of heat insulating performance of the cylinder-head-side heat insulating cover 30 due to dividing the cylinder-head-side heat insulating cover 30 into the upper cylinder-head-side heat insulating cover 33 and the lower cylinder-head-side heat insulating cover 34.

The length of the lower cylinder-head-side heat insulating cover 34 in the longitudinal direction of the vehicle is shorter than that of the upper side wall 32*a* in the longitudinal direction of the vehicle, as illustrated in FIGS. 3 and 4. Specifically, the edge of the lower cylinder-head-side heat insulating cover 34 closer to the front of the vehicle is positioned at substantially the same position as the edge of the upper side wall 32*a* closer to the front of the vehicle. The edge of the lower cylinder-head-side heat insulating cover 34 closer to the rear of the vehicle is closer to the front of the vehicle than the edge of the upper side wall 32*a* closer to the rear of the vehicle in the longitudinal direction of the vehicle. As a result, there is a space behind the edge of the lower cylinder-head-side heat insulating cover 34 closer to the rear of the vehicle, i.e., below the portion of the upper cylinder-head-side heat insulating cover 33 closer to the rear of the vehicle, specifically, below the portion of the upper cylinder-head-side heat insulating cover 33 where the hinge mechanism 36 is attached. As a result, when the upper cylinder-head-side heat insulating cover 33 is rotated between the closed position and the open position by the hinge mechanism 36, such a space is used to allow the upper cylinder-head-side heat insulating cover 33 near the hinge mechanism 36 to be rotated.

On the other hand, the vertical length of the lower cylinder-head-side heat insulating cover 34 is long enough to sufficiently heat-insulate the cylinder head 2. Specifically, the lower edge of the lower side wall 32*b* that is the lower cylinder-head-side heat insulating cover 34 is positioned below an upper edge of a corresponding one of the second side walls 43. Thus, a predetermined length or more of the lower side wall 32*b* when viewed from the side of the vehicle overlaps with the corresponding second side wall 43.

That is to say, heat of the cylinder head 2 and the cylinder block 3 dissipates due to heat transmission and radiation to air after the engine 1 is stopped. The air, around the cylinder head 2 and the cylinder block 3, that has been heated because of heat transmission from the cylinder head 2 and the cylinder block 3 moves upward and stays in the cylinder-head-side heat insulating cover 30. Allowing the lower edge of the first side wall 32 of the cylinder-head-side heat insulating cover 30 (strictly speaking, the lower side wall 32*b* of the lower cylinder-head-side heat insulating cover 34) to be positioned below the upper edge of the second side wall 43 can increase the volume of the air housed inside the cylinder-head-side heat insulating cover 30. Therefore, the cylinder head 2 can be covered with a large amount of air that has been heated, thereby making it possible to efficiently heat-insulate the cylinder head 2. Further, the first side wall 32 (strictly speaking, the lower side wall 32*b*) and the second side wall 43 overlap with each other when viewed from the side of the vehicle. The coinciding portion can double shield radiation from the cylinder block 3, and thus, the heat of the cylinder block 3 can also be efficiently insulated.

The vertical length of the lower cylinder-head-side heat insulating cover 34 will now be described, specifically, with reference to FIG. 6.

Figure 6:
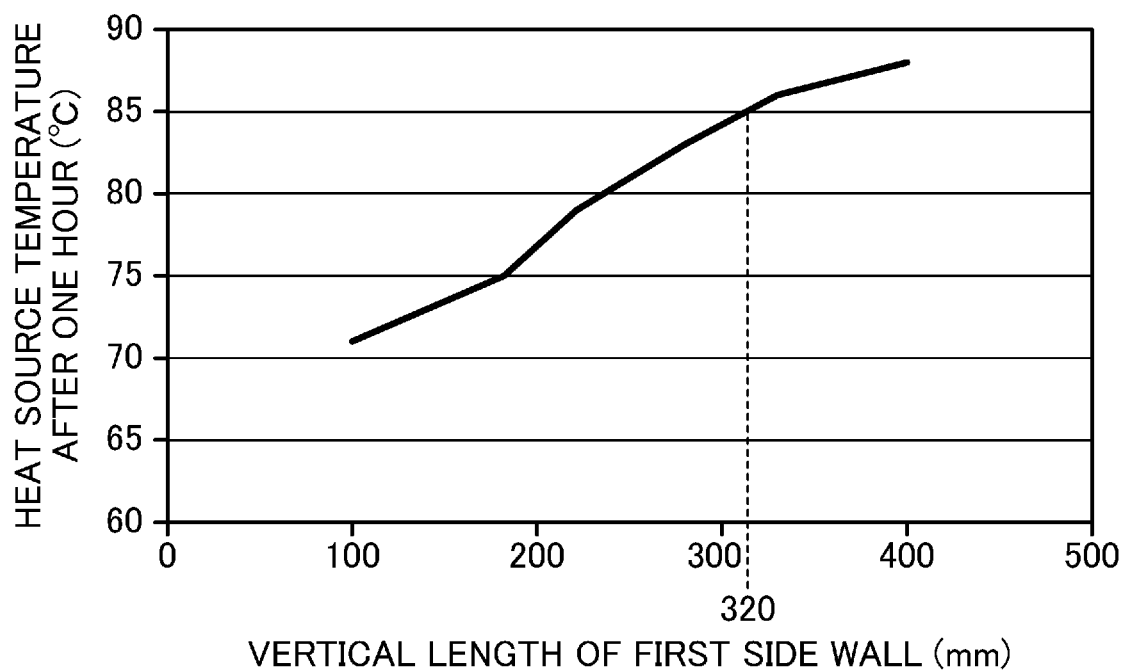
FIG. 6 is a graph showing a relationship between the vertical length of a first side wall and heat insulating performance of the cylinder head.

FIG. 6 is a graph showing a calculation result of a relationship between the vertical length of the first side wall 32 (i.e., the total of the vertical length of the upper side wall 32*a* and the vertical length of the lower side wall 32*b*) and the heat insulating state of the cylinder head 2. This relationship is calculated through a simulation. In FIG. 6, the abscissa represents the vertical length of the first side wall 32, whereas the ordinate represents the temperature of the cylinder head 2 after a lapse of one hour from the stop of the engine 1 that had been driven for raising the temperature of the cylinder head 2 (hereinafter referred to as a "temperature after one hour").

In this simulation, the calculation is performed using a model in which the first side wall 32 is not divided into the upper side wall 32a and the lower side wall 32b, and in which the upper side wall 32a and the lower side wall 32b are integrally formed with each other. In this embodiment, when the upper cylinder-head-side heat insulating cover 33 is at the closed position, the upper cylinder-head-side heat insulating cover 33 abuts on the rubber member 37 provided in the lower heat insulating cover 34 to form no gap between the upper side wall 32a and the lower side wall 32b, such that the upper side wall 32a and the lower side wall 32b are almost integrally formed with each other. The configuration of the above model is equivalent in heat insulating performance to that of this embodiment. In FIG. 6, the interval between the top wall 31 and the top surface of the cylinder head 2 is assumed to be 100 mm, and the vertical length of the cylinder head 2 is assumed to be 180 mm. That is to say, in this simulation, when the vertical length of the first side wall 32 is 100 mm, the height position of the lower edge of the first side wall 32 is the same as that of the top surface of the cylinder head 2. When the vertical length of the first side wall 32 is 280 mm, the height position of the lower edge of the first side wall 32 is the same as that of the bottom surface of the cylinder head 2. Also, in this simulation, the temperature of the cylinder head 2 is calculated when one hour has passed after the stop of the engine 1 that had been driven for raising the temperature to 90° C. The temperature of outdoor air is assumed to be 25° C.

With reference to FIG. 6, when the vertical length of the first side wall 32 is 100 mm, i.e., when the height position of the top surface of the cylinder head 2 is the same as that of the lower edge of the first side wall 32, and the side surface of the cylinder head 2 in the vehicle width direction is not covered with the first side wall 32, the temperature after one hour decreases to 71° C. If the vertical length of the lower side wall 32 is increased from this length, the temperature after one hour rises with the increase in the vertical length of the first side wall 32. When the vertical length of the first side wall 32 is about 280 mm, i.e., when the height position of the bottom surface of the cylinder head 2 is the same as that of the lower edge of the first side wall 32, the temperature after one hour reaches 83° C. That is to say, even when the height position of the bottom surface of the cylinder head 2 is the same as that of the lower edge of the first side wall 32, the temperature after one hour drops by about 10° C. In a situation where the vertical length of the lower side wall 32 is further increased to allow the lower portion of the first side wall 32 to overlap with the side surface of the cylinder block 3 in the vehicle width direction, if the vertical length of the first side wall 32 is about 320 mm, the temperature after one hour reaches 85° C. If the vertical length of the first side wall 32 is further increased from this length, the temperature after one hour rises slightly.

That is to say, according to this simulation, in order to keep the temperature after one hour of the cylinder head 2 at 85° C. or more, the vertical length of the first side wall 32 has to be long enough to allow the lower edge of the first side wall 32 to overlap with the side surface of the cylinder block 3 in the vehicle width direction. Specifically, suppose that calculate the coinciding portion of the first side wall 32 and the side surface of the cylinder block 3 in the vehicle width direction such that the temperature after one hour is 85° C. or more. When the one hour after temperature is 85° C. or more, the vertical length of the first side wall 32 is 320 mm. Thus, the coinciding portion is 40 mm which is a result of subtracting, from this vertical length, the interval between the top wall 31 and the top surface of the cylinder head 2 (100 mm), and the vertical length of the cylinder head 2 (180 mm). In other words, in order that the temperature after one hour is 85° C. or more, the coinciding portion of the first side wall 32 and the side surface of the cylinder block 3 in the vehicle width direction should have a length of 40 mm or more. In this embodiment, the vertical length of the lower side wall 32b, i.e., the vertical length of the lower cylinder-head-side heat insulating cover 34 is determined such that the coinciding portion of the lower cylinder-head-side heat insulating cover 34 with the side surface of the cylinder block 3 in the vehicle width direction, more specifically, the second side wall 43 of the cylinder-block-side heat insulating cover 40 covering the cylinder block 3, when viewed from the side of the vehicle has a length of about 40 mm or more.

The lower cylinder-head-side heat insulating cover 34 on the right in the vehicle width direction is fixed to a door frame (not illustrated), whereas the lower cylinder-head-side heat insulating cover 34 on the left in the vehicle width direction is fixed to a bracket (not illustrated) of a battery.

The cylinder-block-side heat insulating cover 40 includes, as illustrated in FIG. 3, a front wall 41, a rear wall 42, the second side walls 43, and a bottom 44. The front wall 41 covers a surface of the cylinder block 3 closer to the front of the vehicle. The rear wall 42 covers a surface of the cylinder block 3 closer to the rear of the vehicle. The second side walls 43 cover both sides of the cylinder block 3 in the vehicle width direction. The bottom 44 substantially covers the whole of the oil pan 4.

The elements 41-44 of the cylinder-block-side heat insulating cover 40 are disposed inward of the cylinder-head-side heat insulating cover 30 in the vehicle width direction. Specifically, the elements 41-44 are disposed so as to be in contact with the surfaces of the cylinder block 3 and the oil pan 4. More specifically, as illustrated in FIG. 3, the elements 41-44 are in contact with the surfaces of the cylinder block 3 and the oil pan 4 while avoiding contact with auxiliary machines, such as a water pump (not illustrated), an alternator (not illustrated), an air compressor (not illustrated), and a timing chain sprocket 18, provided to the cylinder block 3, and a connection between the transmission 20 and the engine 1, as illustrated in FIG. 1.

The front wall 41, the rear wall 42, and the second side walls 43 of the cylinder-block-side heat insulating cover 40 extend toward upper edges of the respective side surfaces of the cylinder block 3 so as to cover the respective side surfaces. This allows, as illustrated in FIG. 3, the lower portion of the first side wall 32 of the cylinder-head-side heat insulating cover 30, specifically, the lower portion of the lower cylinder-head-side heat insulating cover 34 to overlap vertically with the upper portion of the second side wall 43 of the cylinder-block-side heat insulating cover 40 when viewed from the side of the vehicle.

Although not illustrated, the cylinder-block-side heat insulating cover 40 is bolted to brackets provided to the side surfaces of the cylinder block 3 and the oil pan 4 to be attached to the cylinder block 3 and the oil pan 4.

In this embodiment, as illustrated in FIG. 4, the transmission 20 is also covered with a cover for heat-insulating the transmission 20 (hereinafter referred to as a "transmission heat insulating cover 50").

Similarly to the cylinder-block-side heat insulating cover 40, the transmission heat insulating cover 50 is disposed in contact with the entire surface of the transmission 20 so as to avoid contact with, e.g., auxiliary machines connected to the transmission 20.

The transmission heat insulating cover 50 is attached to the transmission 20 with, e.g., a bolt, as illustrated in FIG. 4.

In this way, the transmission 20 is covered with the transmission heat insulating cover 50 to heat-insulate the transmission 20. This reduces the viscosity of lubricating oil supplied to, e.g., a torque converter of the transmission 20. This makes it possible to supply a necessary amount of lubricating oil for lubricating, e.g., the torque converter even if the drive force of the oil pump disposed in the transmission 20, driven by the engine 1, and supplying, e.g., the torque converter with lubricating oil is decreased. As a result, the engine output for generating the drive force of the oil pump can be reduced to improve fuel economy. If the transmission 20 is a manual transmission, it is necessary to cool the manual transmission itself with headwind entering the vehicle during running of the vehicle, and thus, it is preferable not to provide the transmission heat insulating cover 50.

Figure 7:
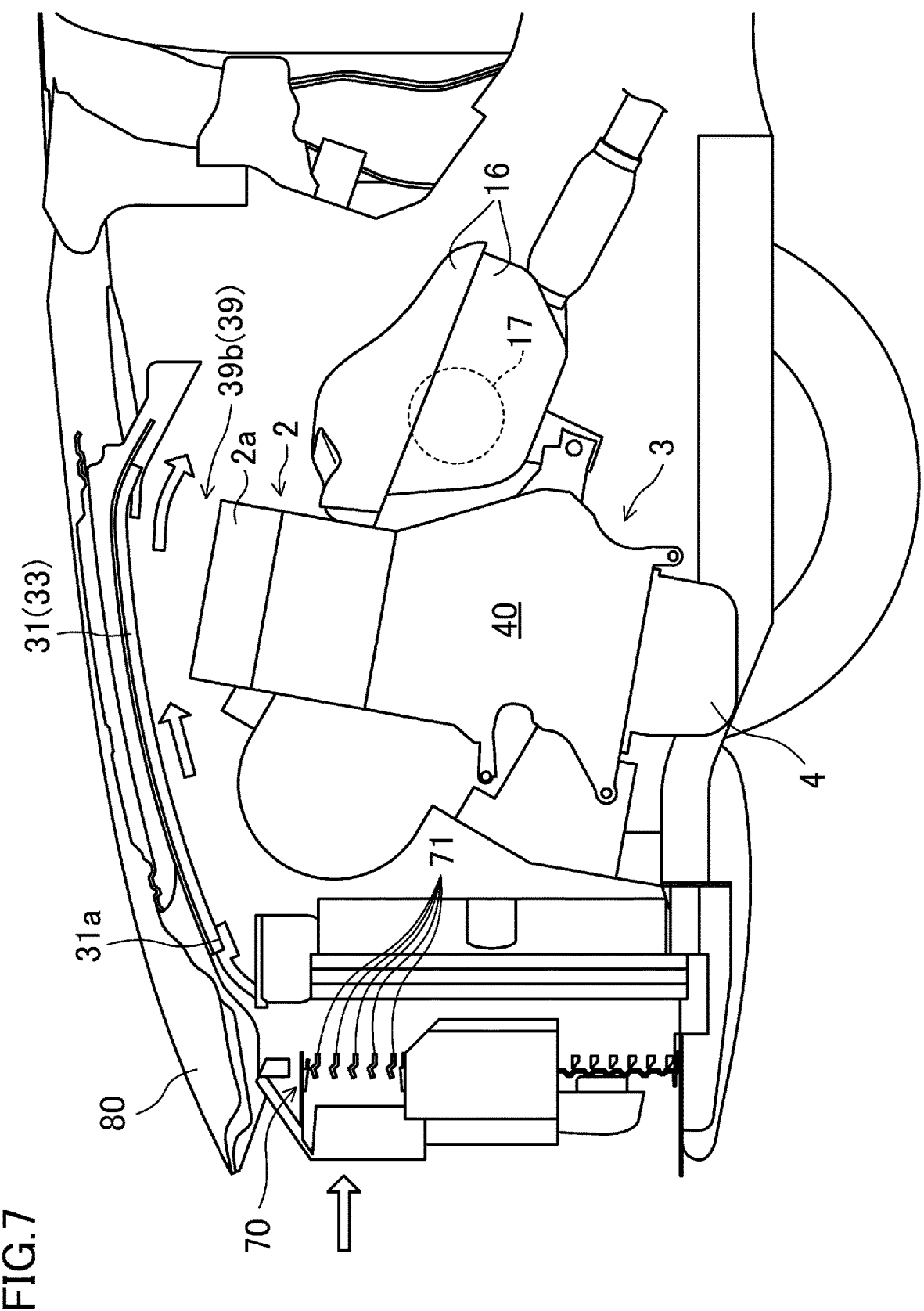
FIG. 7 is a cross-sectional view of the front of the vehicle along a longitudinal direction of the vehicle in a state where a bonnet and the upper cylinder-head-side heat insulating cover are closed.

Next, with reference to FIG. 7, a grille shutter 70 for adjusting the amount of the headwind entering the cylinder-head-side heat insulating cover 30 during running of the vehicle will be described. In FIG. 7, regarding the cylinder head 2 and the cylinder block 3, only its outline is illustrated, and illustration of its inner configuration will be omitted.

As illustrated in FIG. 7, the grille shutter 70 is disposed before the edge of the cylinder-head-side heat insulating cover 30 closer to the front of the vehicle in the longitudinal direction of the vehicle, specifically, before the radiator shroud 60 in the longitudinal direction of the vehicle. The grille shutter 70 includes a plurality of vertically rotatable fins 71 (five fins in FIG. 7) disposed in the vertical direction, and rotation of the fins 71 adjusts the open degree of the grille shutter 70. Specifically, the grille shutter 70 is configured such that the degree of opening of the grille shutter 70 is minimum in a situation where the orientation of the fins 71 are perpendicular to the running direction of the vehicle, whereas the degree of opening of the grille shutter 70 is maximum in a situation where the fins 71 are rotated (rotated counterclockwise in FIG. 7) to allow the orientation of the fins 71 to be parallel to the running direction of the vehicle. The amount of headwind entering the cylinder-head-side heat insulating cover 30 during running of the vehicle is set to be increased with the increase in the open degree of the grille shutter 70.

The rotation angle of each fin 71 (i.e., the open degree of the grille shutter 70) is configured to be changed by a control signal from a control unit which is not illustrated. The control unit, if there is a requirement for cooling the engine 1, in particular, for cooling the cylinder head 2, adjusts the amount of headwind entering the cylinder-head-side heat insulating cover 30 during running of the vehicle by adjusting the angle of each fin 71 in accordance with the requirement. Specifically, the control unit detects the temperature of engine cooling water (hereinafter referred to as an "engine water temperature") based on a signal from a water temperature sensor (not illustrated) inserted into a water jacket (not illustrated) of the cylinder head 2, and estimates the temperature of exhaust gas based on an engine torque or an introduction amount of fresh air. The control unit houses, in advance, a map for determining the rotation angle of each fin 71 based on the detected engine water temperature and the estimated exhaust gas temperature. The control unit determines the rotation angle of each fin 71 based on the map. As a result, the appropriate amount of headwind enters the vehicle during running of the vehicle in accordance with the requirement for cooling the cylinder head 2. The control unit may be configured to estimate the temperature of the cylinder head 2 based on the detected engine water temperature and the estimated exhaust gas temperature to determine the rotation angle of each fin 71 based on the thus estimated temperature.

Keeping the temperature of the engine 1 by the cylinder-head-side and cylinder-block-side heat insulating covers 30 and 40 enables quick warming of the engine 1 in a situation where the engine 1 is restarted after temporary stop of the engine 1 or a situation where the engine 1 is started from its cold state. In particular, in this embodiment, when viewed from the side of the vehicle, the vertical length of the first side wall 32 (strictly speaking, the lower side wall 32*b*) is long such that the lower portion of the first side wall 32 overlaps with the side surface of the cylinder block 3 in the vehicle width direction, i.e., the upper portion of the second side wall 43. Thus, sufficient heat insulation effect can be obtained. In this way, if the engine 1 can be warmed quickly, it is possible to reduce the exhaust gas amount at the start of the engine 1.

Here, under high speed driving conditions, heat is confined in the cylinder-head-side and cylinder-block-side heat insulating covers 30 and 40, resulting in excessively high temperature of the cylinder head 2. A fuel injection valve 11 and an ignition plug 2 provided to the cylinder head 2 have relatively low heat resistance. Therefore, it is necessary to cool the cylinder head 2 not to cause malfunction of these components. It is not preferable that the cylinder block 3 be cooled as much as the cylinder head 2 in order to keep appropriate temperature of the inner cylinder.

In this embodiment, the cylinder-head-side heat insulating cover 30 is disposed apart from the top surface of the cylinder head 2 and both side surfaces of the cylinder block 3 in the vehicle width direction. Thus, headwind entering the front of the vehicle during running of the vehicle through the grille shutter 70 is introduced from the releasing portion 39*a* (see FIG. 5) of the cylinder-head-side heat insulating cover 30 in the front of the vehicle into a space between the cylinder-head-side heat insulating cover 30 and the engine 1 (the cylinder head 2 and the cylinder block 3), and flows through a space between the cylinder-head-side heat insulating cover 30 and the cylinder head 2 and the cylinder block 3 to cool the cylinder head 2. In other words, the space between the cylinder-head-side heat insulating cover 30 and the engine 1 constitutes a flow channel through which the headwind flows.

The cylinder-block-side heat insulating cover 40 is provided to the cylinder block 3 so as to be in contact with surfaces of the cylinder block 3, namely, the surface closer to the front of the vehicle, the surface closer to the rear of the vehicle, and both side surfaces in the vehicle width direction. Thus, the headwind during running of the vehicle is not brought into direct contact with the cylinder block 3, and the cylinder block 3 is not cooled by the headwind. That is to say, the cylinder block 3 can be kept warm while the cylinder block 2 can be actively cooled.

Furthermore, in this embodiment, the grille shutter 70 can adjust the amount of the headwind, during running of the vehicle, flowing into the flow passage in the space between the cylinder-head-side heat insulating cover 30 and the engine 1 (the cylinder head 2 and the cylinder block 3). Thus, it is possible to restrict the amount of the headwind during running of the vehicle in order not to introduce, into the flow passage, an unnecessarily large amount of the headwind for cooling the cylinder head 2.

Therefore, according to the embodiment, the cylinder block 2 that is a part of the engine 1 can be actively cooled while the entire engine 1 can be kept warm.

In this embodiment, the portion of the top wall 31 closer to the rear of the vehicle is obliquely curved downwardly such that the headwind, during running of the vehicle, that has been introduced into the flow passage in the space between the cylinder-head-side heat insulating cover 30 and the engine 1 (the cylinder head 2 and the cylinder block 3) flows toward the exhaust manifold and the direct catalyst 17. This can prevent deterioration of exhaust gas purification performance of the direct catalyst 17 at the time of exhausting high temperature exhaust gas under high speed driving conditions. On top of that, this can avoids deterioration of fuel consumption due to cooling the direct catalyst 17.

That is to say, under high speed driving conditions, since high temperature exhaust gas is likely to flow in the direct catalyst 17, the temperature of the direct catalyst 17 is likely to rise. The exhaust gas purification performance of the direct catalyst 17 is improved by raising the temperature of a catalyst in the direct catalyst 17 and activating the catalyst. However, if the temperature of the catalyst in the direct catalyst 17 exceeds the upper limit of the activation temperature, the exhaust gas purification performance of the catalyst is deteriorated.

In order to substantially prevent deterioration of the exhaust gas purification performance of the direct catalyst 17 (strictly speaking, the catalyst in the direct catalyst 17), a method of cooling the direct catalyst 17 may be applicable, the method including mixing unburned fuel into exhaust gas, vaporizing the unburned fuel with heat of the direct catalyst 17 (strictly speaking, the catalyst in the direct catalyst 17), and cooling the direct catalyst 17 using the heat of vaporization. However, according to this method, fuel consumption increases by the amount of such unburned fuel to be mixed into the exhaust gas.

In this embodiment, the portion of the top wall 31 closer to the rear of the vehicle is obliquely curved downwardly such that the headwind during running of the vehicle flows toward the exhaust manifold and the direct catalyst 17. Accordingly, as indicated by the open arrows shown in FIG. 7, the headwind during running of the vehicle is introduced from the releasing portion 39a (see FIG. 5) of the cylinder-head-side heat insulating cover 30 closer to the front of the vehicle into the cylinder-head-side heat insulating cover 30, and then, flows through the space between the cylinder head 2 and the cylinder-head-side heat insulating cover 30 toward the rear of the vehicle. The orientation of the headwind is changed in the curved portion of the top wall 31 closer to the rear of the vehicle such that the headwind flows toward the exhaust manifold and the direct catalyst 17. Then, the headwind is exhausted from a releasing portion 39b of the cylinder-head-side heat insulating cover 30 closer to the rear of the vehicle so as to flow toward the exhaust manifold and the direct catalyst 17. As described above, the top surface of a heat insulator 16 covering the exhaust manifold and the direct catalyst 17 is provided with a plurality of openings 19 (see FIG. 2) for allowing the headwind during running of the vehicle to flow in the heat insulator 16. Thus, the headwind that has flowed from the opening 19 into the heat insulator 16 can cool the direct catalyst 17. This can substantially prevent not only the deterioration of the exhaust gas purification performance of the direct catalyst 17 but also an increase in the fuel consumption due to cooling of the direct catalyst 17.

Furthermore, in this embodiment, the upper cylinder-head-side heat insulating cover 33 of the cylinder-head-side heat insulating cover 30 is provided with the hinge mechanisms 36 capable of opening/closing the upper cylinder-head-side heat insulating cover 33. Thus, for example, oil in the engine 1 can be exchanged with the upper cylinder-head-side heat insulating cover 33 rotated to the open position. This can simplify the maintenance of the engine 1 even if the cylinder head 2 is covered with the cylinder-head-side heat insulating cover 30 from above.

Figure 8:
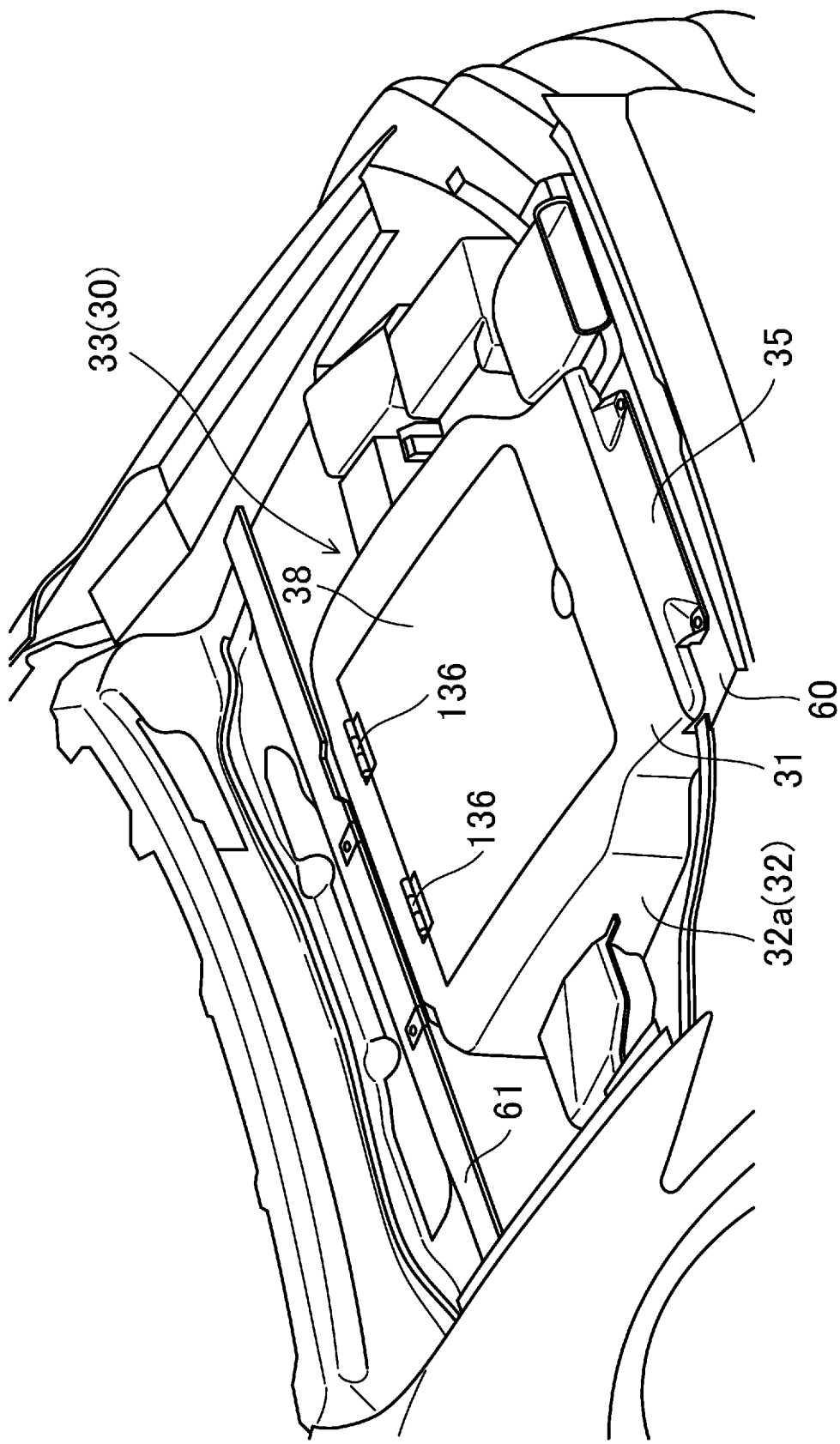
FIG. 8 illustrates a variation of the embodiment.

FIG. 8 illustrates a variation of the embodiment. Specifically, in the above embodiment, the upper side wall 32a of the upper cylinder-head-side heat insulating cover 33 is provided with the hinge mechanisms 36 to open/close the entire upper cylinder-head-side heat insulating cover 33. Alternatively, as illustrated in FIG. 8, instead of providing the upper side wall 32a with the hinge mechanism 36, the substantially entire top wall 31 may be cut to form a lid 38, and the lid 38 may be provided with hinge mechanisms 136. In such a configuration, the hinge mechanism 136 rotates the lid 38 upward to open the lid 38, thereby making it possible to view the engine 1 from above. Such a configuration can also simplify the maintenance of the engine 1 even if the cylinder head 2 is covered with the cylinder-head-side heat insulating cover 30 from above.

Also, in the above embodiment, a space is needed for avoiding contact between the edge of the upper side wall 32a closer to the front of the vehicle does and the radiator shroud 60 when the upper cylinder-head-side heat insulating cover 33 is rotated by the hinge mechanism 36. In this variation, the lid 38 does not abut on the radiator shroud 60, and thus, such a space is not needed, which is an advantage of the variation.

In this variation, as long as the lid 38 can be opened/closed, the hinge mechanism 136 may be provided to, e.g., an edge of the lid 38 in the vehicle width direction or an edge of the lid 38 closer to the front of the vehicle. A bonnet 80 is provided above the cylinder-head-side heat insulating cover 30. In order to increase the rotation range of the lid 38, as illustrated in FIG. 8, it is preferable to provide the hinge mechanism 136 to the edge of the lid 38 closer to the rear of the vehicle.

The present disclosure is not limited to this embodiment. Any change can be made within the scope of the claims as appropriate.

For example, in the above embodiment, the cylinder-head-side heat insulating cover 30 is divided into the upper and lower cylinder-head-side heat insulating covers 33 and 34. However, this is merely an example of the present disclosure. The upper and lower cylinder-head-side heat insulating covers 33 and 34 may be integrally formed with each other.

In the above embodiment, the second side walls 43 of the cylinder-block-side heat insulating cover 40 are in contact with the both side surfaces of the cylinder block 3 in the vehicle width direction. However, this is merely an example of the present disclosure. As long as the second side walls 43 are disposed inward of the first side walls 32 in the vehicle width direction, an interval may be formed between each of the second side walls 43 and the corresponding one of the both side surfaces of the cylinder block 3 in the vehicle width direction. The interval between each of the second side walls 43 and the corresponding one of the side surfaces of the cylinder block 3 in the vehicle width direction is narrower than an interval between each of the first side walls 32 and the corresponding one of the both side surfaces of the cylinder head 2 in the vehicle width direction, and an interval between the each of the first side walls 32 and the corresponding one of the both side surfaces of the cylinder block 3 in the vehicle width direction.

Furthermore, in the above embodiment, the cylinder-head-side heat insulating cover 30 (strictly speaking, the upper cylinder-head-side heat insulating cover 33) is provided with the hinge mechanism 36 (136). Alternatively, the hinge mechanism 36 (136) does not have to be provided. In this case, during the maintenance of the engine 1, the entire cylinder-head-side heat insulating cover 30 has to be detached from the vehicle body, or the upper cylinder-head-side heat insulating cover 33 has to be detached from the lower cylinder-head-side heat insulating cover 34, or the lid 38 has to be detached from the top wall 31.

The above embodiment is directed to the transverse engine. However, this is merely an example of the present disclosure. The heat insulating structure according to the embodiment may be applied to a vertical engine in which the cylinder bank direction coincides with the longitudinal direction of the vehicle, and a V-engine in which cylinders are arranged to form a V-shape.

The foregoing embodiment is a merely preferred example in nature, and the scope of the present disclosure should not be interpreted in a limited manner. The scope of the present disclosure is defined by the appended claims, and all variations and modifications belonging to a range equivalent to the range of the claims are within the scope of the present disclosure.

INDUSTRIAL APPLICABILITY

The present disclosure is useful as a heat insulating structure of an internal combustion engine which is housed in an engine compartment provided in the front of a vehicle, and closed/opened by a bonnet, and which includes a cylinder block and a cylinder head coupled to the top of the cylinder block.

DESCRIPTION OF REFERENCE CHARACTERS

1 Engine (Internal Combustion Engine)
2 Cylinder Head
3 Cylinder Block
17 Direct Catalyst (Exhaust Purifier)
30 Cylinder-head-side Heat Insulating Cover
31 Top Wall
32 First Side Wall
33 Upper Cylinder-head-side Heat Insulating Cover
34 Lower Cylinder-head-side Heat Insulating Cover
36 Hinge Mechanism
38 Lid
39 Releasing Portion
40 Cylinder Block-side Heat Insulating Cover
41 Front Wall
42 Rear Wall
43 Second Side Wall
70 Grille Shutter
136 Hinge Mechanism

The invention claimed is:

1. A heat insulating structure of an internal combustion engine which is housed in an engine compartment provided in a front of a vehicle, and closed/opened by a bonnet, and which includes a cylinder block and a cylinder head coupled to a top of the cylinder block, the heat insulating structure comprising:
a cylinder-head-side heat insulating cover having
a top wall facing, and spaced apart from, a head top surface of the cylinder head, and covering a whole of the head top surface,
first side walls extending in a longitudinal direction of the vehicle, each facing, and spaced apart from, a corresponding one of both side surfaces of the cylinder head in a width direction of the vehicle and a corresponding one of upper portions of both side surfaces of the cylinder block in the width direction of the vehicle, and each covering the corresponding one of the both side surfaces of the cylinder head in the width direction of the vehicle and the corresponding one of the upper portions of the both side surfaces of the cylinder block in the width direction of the vehicle, and
releasing portions formed at each of an edge of the top wall proximate to a rear of the vehicle in the engine compartment of the cylinder-head-side heat insulating cover in the longitudinal direction of the vehicle and an edge of the cylinder-head-side heat insulating cover proximate to the front of the vehicle in the engine compartment in the longitudinal direction of the vehicle; and
a cylinder-block-side heat insulating cover having
a front wall covering a front surface of the cylinder block proximate to the front of the vehicle in the engine compartment,
a rear wall covering a rear surface of the cylinder block proximate to the rear of the vehicle in the engine compartment, and second side walls each covering a corresponding one of the both side surfaces of the cylinder block in the width direction of the vehicle, wherein
each of the first side walls is disposed outwardly of, and is spaced apart from, a corresponding one of the second side walls in the width direction of the vehicle, and a lower edge of each of the first side walls is positioned below an upper edge of the corresponding one of the second side walls to overlap with the corresponding one of the second side walls when viewed from a side of the vehicle,
a coinciding portion of one of the first side wads of the cylinder-head-side heat insulating cover and one of the second side walls of the cylinder-block-side heat insulating cover has a vertical length set to 40 mm or more.

2. The heat insulating structure of the internal combustion engine of claim 1, wherein
in the cylinder-block-side heat insulating cover, the front wall is in contact with the front surface of the cylinder block proximate to the front of the vehicle in the engine compartment,
the rear wall is in contact with the rear surface of the cylinder block proximate to the rear of the vehicle in the engine compartment, and
each of the second walls is in contact with the corresponding one of the both side surfaces of the cylinder block in the width direction of the vehicle.

3. The heat insulating structure of the internal combustion engine of claim 2, wherein
an exhaust purifier is disposed behind the internal combustion engine in the longitudinal direction of the vehicle, and below the edge of the top wall proximate to the rear of the vehicle in the engine compartment,
a space between the cylinder-head-side heat insulating cover and the internal combustion engine forms a flow channel in which a headwind during running of the vehicle flows from the releasing portion proximate to the front of the vehicle in the engine compartment, and is discharged from the releasing portion proximate to the rear of the vehicle in the engine compartment, and a portion of the top wall proximate to the rear of the vehicle in the engine compartment curved obliquely downward such that the headwind that has flowed in the flow passage flows toward the exhaust purifier.

4. The heat insulating structure of the internal combustion engine of claim 3, wherein a grille shutter is disposed in a front part of the vehicle at a position closer to the front of the vehicle than the edge of the cylinder-head-side heat insulating cover proximate to the front of the vehicle in the engine compartment, and controls a flow rate of the headwind to be introduced into the flow passage in the space between the cylinder-head-side heat insulating cover and the internal combustion engine.

5. The heat insulating structure of the internal combustion engine of claim 3, wherein the cylinder-head-side heat insulating cover is vertically divided into an upper cylinder-head-side heat insulating cover and a lower cylinder-head-side heat insulating cover, the upper cylinder-head-side heat insulating cover being detachable from the lower cylinder-head-side heat insulating cover, the upper cylinder-head-side heat insulating cover includes the top wall and upper portions of the first side walls, the lower cylinder-head-side heat insulating cover includes lower portions of the first side walls, and the lower cylinder-head-side heat insulating cover of the upper and lower cylinder-headside heat insulating covers overlaps with an upper portion of the cylinder-block-side heat insulating cover when viewed from the side of the vehicle.

6. The heat insulating structure of the internal combustion engine of claim 2, wherein the cylinder-head-side heat insulating cover is vertically divided into an upper cylinder-head-side heat insulating cover and a lower cylinder-head-side heat insulating cover, the upper cylinder-head-side heat insulating cover being detachable from the lower cylinder-head-side heat insulating cover, the upper cylinder-head-side heat insulating cover includes the top wall and upper portions of the first side walls, the lower cylinder-head-side heat insulating cover includes lower portions of the first side walls, and the lower cylinder-head-side heat insulating cover of the upper and lower cylinder-head-side heat insulating covers overlaps with an upper portion of the cylinder-block-side heat insulating cover when viewed from the side of the vehicle.

7. The heat insulating structure of the internal combustion engine of claim 1, wherein an exhaust emission control device is disposed behind the internal combustion engine in the longitudinal direction of the vehicle, and below the edge of the top wall proximate to the rear of the vehicle in the engine compartment, a space between the cylinder-head-side heat insulating cover and the internal combustion engine forms a flow channel in which a headwind during running of the vehicle flows from the releasing portion proximate to the front of the vehicle in the engine compartment, and is discharged from the releasing portion proximate to the rear of the vehicle in the engine compartment, and a portion of the top wall proximate to the rear of the vehicle in the engine compartment is curved obliquely downward such that the headwind that has flowed in the flow passage flows toward the exhaust emission control device.

8. The heat insulating structure of the internal combustion engine of claim 7, wherein a grille shutter is disposed in a front part of the vehicle at a position closer to the front of the vehicle than the edge of the cylinder-head-side heat insulating cover proximate to the front of the vehicle in the engine compartment and controls a flow rate of the headwind to be introduced into the flow passage in the space between the cylinder-head-side heat insulating cover and the internal combustion engine.

9. The heat insulating structure of the internal combustion engine of claim 8, wherein the cylinder-head-side heat insulating cover is vertically divided into an upper cylinder-head-side heat insulating cover and a lower cylinder-head-side heat insulating cover, the upper cylinder-head-side heat insulating cover being detachable from the lower cylinder-head-side heat insulating cover, the upper cylinder-head-side heat insulating cover includes the top wall and upper portions of the first side walls, the lower cylinder-head-side heat insulating cover includes lower portions of the first side walls, and the lower cylinder-head-side heat insulating cover of the upper and lower cylinder-head-side heat insulating covers overlaps with an upper portion of the cylinder-block-side heat insulating cover when viewed from the side of the vehicle.

10. The heat insulating structure of the internal combustion engine of claim 7, wherein the cylinder-head-side heat insulating cover is vertically divided into an upper cylinder-head-side heat insulating cover and a lower cylinder-head-side heat insulating cover, the upper cylinder-head-side heat insulating cover being detachable from the lower cylinder-head-side heat insulating cover, the upper cylinder-head-side heat insulating cover includes the top wall and upper portions of the first side walls, the lower cylinder-head-side heat insulating cover includes lower portions of the first side walls, and the lower cylinder-head-side heat insulating cover of the upper and lower cylinder-head-side heat insulating covers overlaps with an upper portion of the cylinder-block-side heat insulating cover when viewed from the side of the vehicle.

11. The heat insulating structure of the internal combustion engine of claim 1, wherein the cylinder-head-side heat insulating cover is vertically divided into an upper cylinder-head-side heat insulating cover and a lower cylinder-head-side heat insulating cover, the upper cylinder-head-side heat insulating cover being detachable from the lower cylinder-head-side heat insulating cover, the upper cylinder-head-side heat insulating cover includes the top wall and upper portions of the first side walls, the lower cylinder-head-side heat insulating cover includes lower portions of the first side walls, and the lower cylinder-head-side heat insulating cover of the upper and lower cylinder-head-side heat insulating covers overlaps with an upper portion of the cylinder-block-side heat insulating cover when viewed from the side of the vehicle.

\* \* \* \* \*